United States Patent
Dauby et al.

(10) Patent No.: US 10,675,910 B2
(45) Date of Patent: Jun. 9, 2020

(54) ROLLER DISPLAY DEVICE

(71) Applicant: Montres Breguet S.A., L'Abbaye (CH)

(72) Inventors: Sylvain Dauby, Le Sentier (CH);
Sylvain Marechal, Bois-d'Amont (FR)

(73) Assignee: Montres Breguet S.A., L'Abbaye (CH)

( * ) Notice: Subject to any disclaimer, the term of this patent is extended or adjusted under 35 U.S.C. 154(b) by 0 days.

(21) Appl. No.: 16/214,281

(22) Filed: Dec. 10, 2018

(65) Prior Publication Data
US 2019/0193456 A1 Jun. 27, 2019

(30) Foreign Application Priority Data
Dec. 22, 2017 (EP) .................................... 17210337

(51) Int. Cl.
| | | |
|---|---|---|
| *B43K 29/087* | (2006.01) | |
| *G04B 19/21* | (2006.01) | |
| *G04B 47/06* | (2006.01) | |
| *F16C 19/02* | (2006.01) | |
| *G04B 19/22* | (2006.01) | |

(Continued)

(52) U.S. Cl.
CPC ............ *B43K 29/087* (2013.01); *F16C 29/02* (2013.01); *G04B 18/02* (2013.01); *G04B 19/21* (2013.01); *G04B 19/223* (2013.01); *G04B 47/06* (2013.01); *F16C 43/02* (2013.01); *F16H 29/12* (2013.01); *G04B 27/00* (2013.01)

(58) Field of Classification Search
CPC ...... B43K 29/087; G04B 18/02; G04B 19/21; G04B 19/223; G04B 47/06; G04B 27/00; G04B 19/24346; G04B 19/257; G04C 17/0025; F16H 29/12; F16C 29/002; F16C 29/02; F16C 43/02

USPC ........... 384/37–38, 40–41; 368/78, 124, 274, 368/178, 276; 968/164; 235/133 R
See application file for complete search history.

(56) References Cited

U.S. PATENT DOCUMENTS

| | | | |
|---|---|---|---|
| 2,748,560 A * | 6/1956 | Clark .................... | G04B 19/21 235/143 |
| 3,574,995 A | 4/1971 | Turner | |

(Continued)

FOREIGN PATENT DOCUMENTS

| | | | |
|---|---|---|---|
| CH | 155 514 | 6/1932 | |
| GB | 1411453 A * | 10/1975 | ............. G04B 19/21 |
| GB | 2 135 481 A | 8/1984 | |

OTHER PUBLICATIONS

European Search Report dated Jun. 6, 2018 in European Application 17210337.6, filed on Dec. 22, 2017 (with English Translation of Categories of Cited Documents).

*Primary Examiner* — Marcus Charles
(74) *Attorney, Agent, or Firm* — Oblon, McClelland, Maier & Neustadt, L.L.P.

(57) ABSTRACT

A device for displaying at least one time-related magnitude including a timepiece movement including at least one time base and at least one energy source which extend in a first same plane, and at least one roller pivotably mounted about an axis of rotation A and which extends in a second plane parallel to the first plane, at least one roller including a display strip arranged on an outer periphery and on which at least one indication of the time-related magnitude is inscribed, the timepiece movement driving at least one roller in rotation about axis A via drive device which extend in the same second plane as at least one roller, at least one roller and the timepiece movement being centred on axis A.

11 Claims, 3 Drawing Sheets

(51) Int. Cl.
*F16C 29/02* (2006.01)
*G04B 18/02* (2006.01)
G04B 27/00 (2006.01)
F16C 43/02 (2006.01)
F16H 29/12 (2006.01)

(56) References Cited

U.S. PATENT DOCUMENTS

| | | | | |
|---|---|---|---|---|
| 3,690,063 | A | * | 9/1972 | Strachan ............ G04C 17/0075 368/222 |
| 3,807,167 | A | * | 4/1974 | Chappatte .............. G04B 19/21 368/222 |
| 3,898,792 | A | * | 8/1975 | Insley .................... G04B 19/21 368/185 |
| 3,903,687 | A | * | 9/1975 | Marquis ................ G04B 19/21 968/248 |
| 4,192,136 | A | * | 3/1980 | Robinson ............... G04B 19/21 235/133 R |
| 4,568,197 | A | | 2/1986 | Lam |
| 7,946,757 | B2 | * | 5/2011 | Buttet .................. G04B 17/285 368/170 |

* cited by examiner

ROLLER DISPLAY DEVICE

CROSS-REFERENCE TO RELATED APPLICATION

This application claims priority to European Patent Application No. 17210337.6 filed on Dec. 22, 2017, the entire disclosure of which is hereby incorporated herein by reference.

FIELD OF THE INVENTION

The present invention relates to a timepiece display device including at least one roller pivoting about an axis. The invention also concerns a writing instrument including at least one such display device.

The invention concerns the field of timepiece display devices, especially for watches and writing instruments.

BACKGROUND OF THE INVENTION

Generally speaking, timepiece displays are rarely made using rollers since indications in this form have a relatively high thickness due to the diameter of the roller, comprising, for example, up to 31 indications for the days of the month, 12 or 24 indications for the hours, or even 60 indications for the minutes. This type of embodiment is even more difficult in the case of a writing instrument such as a pen where the available space is limited.

There is known from WO Patent No 2014174364 a writing instrument comprising a tubular gripping body inside which there is a housing for receiving a reserve of ink, a writing nib at one end of the tubular body being able to be connected to a reserve of ink arranged inside the housing, and a timepiece mechanism housed inside the tubular gripping body.

However, such a timepiece mechanism remains cumbersome inside the writing instrument because of its tiered design. This design has several drawbacks: on the one hand this limits the available display surface, and, on the other hand, this reduces the available reserve of ink since the mechanism extends upwardly.

SUMMARY OF THE INVENTION

It is an object of the invention to overcome the various drawbacks of these known techniques.

More specifically, it is an object of the invention to provide a compact mechanism wherein the movement components are in the same plane.

It is also an object of the invention, at least in a particular embodiment, to provide a display device offering an easily visible display surface.

These objects, in addition to others which will appear more clearly hereinafter, are achieved by the invention by means of a device for displaying at least one time-related magnitude, the display device including a timepiece movement comprising at least one time base and at least one energy source which extend in a first same plane, and at least one roller pivotably mounted about an axis of rotation A and which extends in a second plane parallel to the first plane, the at least one roller comprising a display strip disposed on an outer periphery and on which at least one indication of the time-related magnitude is inscribed, the timepiece movement driving the at least one roller in rotation about axis A via drive means which extend in the same second plane as the at least one roller, the at least one roller and the timepiece movement being centred on axis A.

According to other advantageous variants of the invention:

the means for driving the at least one roller include a toothed ring integral with the at least one roller and pivoting about the axis of rotation;

the display mechanism includes a frame about which the at least one roller rotates;

the frame is integral with a receptacle arranged to receive the movement;

the frame includes at least one bar at each of its ends, consisting of a first bar, called the upper bar and a second bar, called the lower bar;

the mechanism includes a first roller and a second roller, each roller comprising a display strip arranged on a circumference of the roller and in a plane perpendicular to the axis of rotation of the roller;

the first roller pivots about the upper bar, and the second roller pivots about the lower bar, each roller comprising drive means for pivoting the rollers about axis A;

an intermediate fixed bar is arranged between the first roller and the second roller;

the intermediate bar has, on its periphery, an indicator for reading the time and/or the date;

the first roller indicates the time and the second roller indicates the date;

the at least one time base includes transmission means in the form of a train, energy distribution means such as an escapement, regulating means such as a balance/balance spring;

the at least one energy source includes a barrel.

The invention also concerns a writing instrument including a display device according to the invention, the mechanism being housed at one end of the pen or inside the body of the writing instrument.

BRIEF DESCRIPTION OF THE DRAWINGS

Other features and advantages of the present invention will appear more clearly from the following detailed description of an example embodiment of a device for displaying time according to the invention, this example being given solely by way of non-limiting illustration with reference to the annexed drawings, in which.

DETAILED DESCRIPTION OF PREFERRED EMBODIMENTS

Figure 1A:
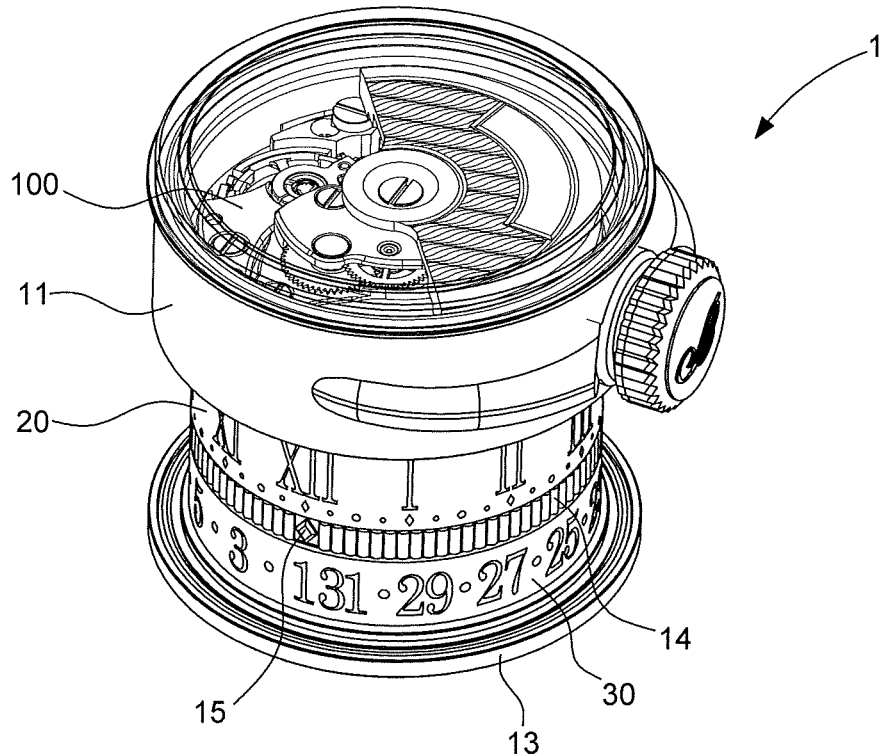
FIGS. 1a and 1b respectively illustrate a perspective view and a cross-sectional view of a display mechanism according to the invention.

The invention is illustrated in the Figures, in a non-limiting manner, with a timepiece display device including two rollers respectively displaying an item of information relating to the current time and an item of information relating to the date.

In the following description, the device includes, by way of non-limiting illustration, two rollers. Those skilled in the art could adapt the invention to a single roller or to more than two rollers without any particular difficulty.

Thus, the invention concerns a device 1 for displaying at least one time-related magnitude, the magnitude may be the current time for example, namely the hours and minutes; the seconds can also be added, and the date can also be displayed.

More specifically, display device 1 includes a timepiece movement 100 including at least one time base and at least one energy source which extend in a first same plane, and at least one roller 2, 3, pivotably mounted about an axis of rotation A and which extends hr a second plane parallel to the first plane, the at least one roller 2, 3 comprising a display strip 20, 30 arranged on an outer periphery and on which at least one indication of the time related magnitude is inscribed, The timepiece movement 100 driving in rotation the at least one roller 2, 3 about axis A via drive means 4, 5 which extend in the same second plane as the at least one roller 2, 3, the at least one roller 2, 3 and timepiece movement 100 being centred on axis A.

In a conventional manner, the timepiece movement includes a drive member such as a barrel, transmission means in the form of a train, energy distribution means such as an escapement, regulating means such as a balance/balance spring and display means. The movement can also include manual or automatic winding means.

According to the invention, the aforecited components forming movement 100 are mounted on a same plane, and on a same bar which is arranged to carry the components.

The Figures illustrate in a non-limiting manner a device 1 comprising a first roller 2 and a second roller 3, each roller comprising a display strip 20, 30 arranged on a circumference of the roller and in a plane perpendicular to the axis of rotation of the roller.

Advantageously, rollers 2 and 3 are concentric to movement 100, i.e. axis of rotation A passes through their respective centre, and the display strip of rollers 2, 3 is perpendicular to the plane formed by movement 100. Display strip 20 of the first roller is arranged to receive current time indications and display strip 30 of the second roller is arranged to receive date indications; the information can take the form of Roman or Arabic numerals for example.

Figure 2A:
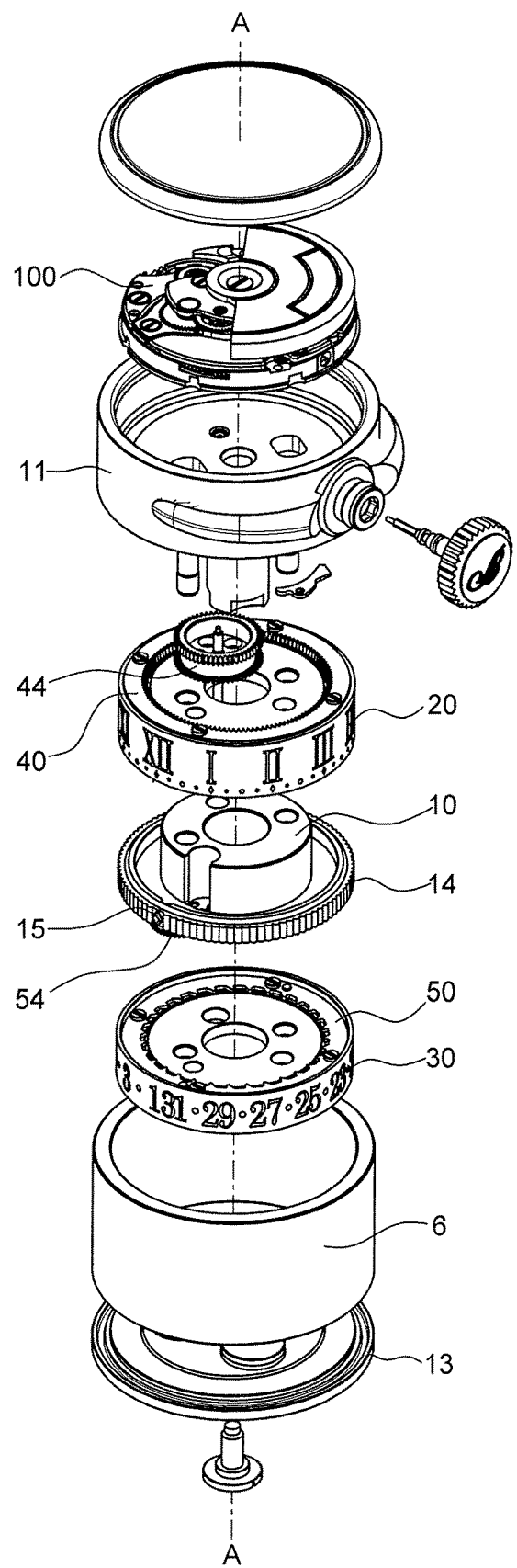
FIGS. 2a and 2b represent exploded perspective views of a display mechanism according to the invention.
Figure 2B:
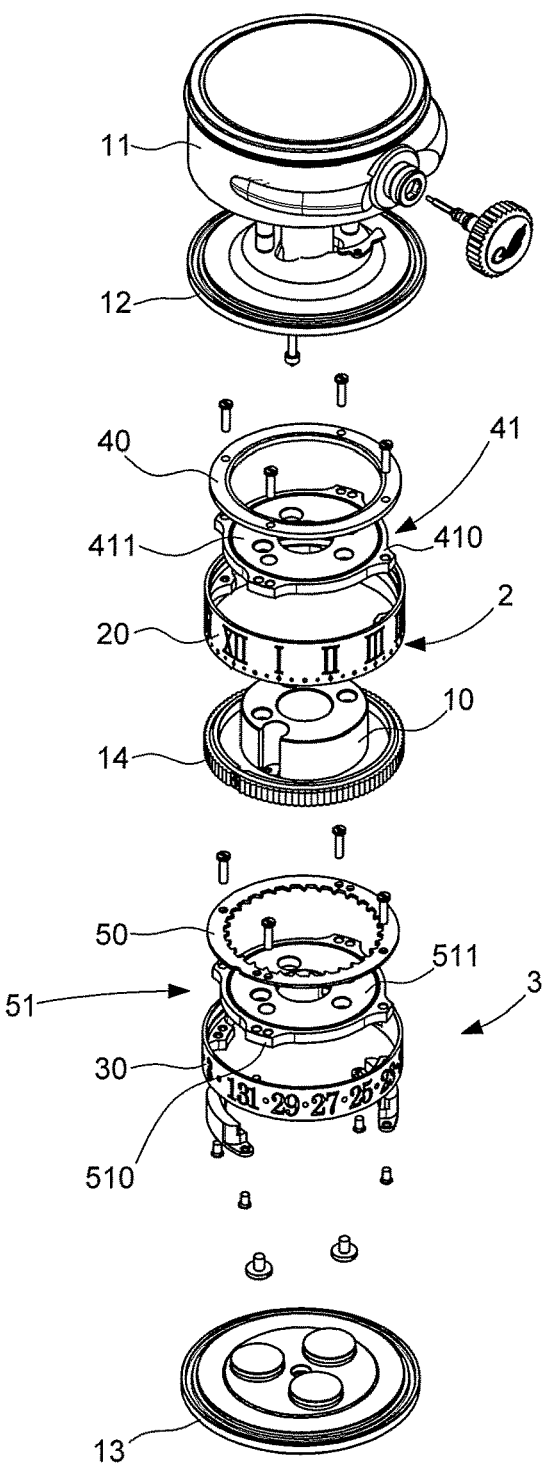

As can be observed in FIGS. 2a and 2b, roller 2, 3 is formed by a support member 41, 51, a display strip 20, 30 arranged on a circumference of roller 2, 3 and at the outer periphery of the at least one roller 2, 3, and comprises drive means 4, 5.

Advantageously, each support member 41, 51 includes a movable peripheral portion 410, 510 integral with the roller and a fixed central portion 411, 511, a ball or roller bearing which can be placed between the movable portion and the fixed portion in order to limit friction and facilitate the movement of roller 2, 3.

As represented in the Figures, the device includes a frame 10 about which first and second rollers 2 and 3 rotate. As illustrated, frame 10 is surmounted by a case 11 of cylindrical shape and is arranged to receive movement 100, case 11 being integral with the frame and including a through hole for transmission from the movement to rollers 2, 3.

As can be observed in the Figures, frame 10 includes at least one bar at each of its ends, namely a first bar, called upper bar 12 and a second bar, called lower bar 13, upper bar 12 and lower bar 13 also being centred on axis of rotation A. According to a particular aspect of the invention, upper bar 12 forms a one-piece element with case 11, upper bar 12 being directly machined at the base of case 11. Evidently, those skilled in the art could also envisage two distinct elements that are subsequently assembled to each other, but the fact that upper bar 12 is machined directly in the case allows, amongst other things, savings of material and easier and quicker assembly.

Thus, first roller 2 pivots about upper bar 12, and second roller 3 pivots about lower bar 13, each roller 2, 3 respectively comprising first and second drive means 4, 5 for pivoting about axis of rotation A.

Further, the device includes an intermediate bar 14 which is fixedly mounted, arranged between first roller 2 and second roller 3, and arranged to be visible between the two rollers. Advantageously, intermediate bar 14 has, on its periphery, an indicator 15 allowing the time and/or date to be read.

According to a preferred embodiment of the invention, intermediate bar 14 carries frame 10.

Figure 3:
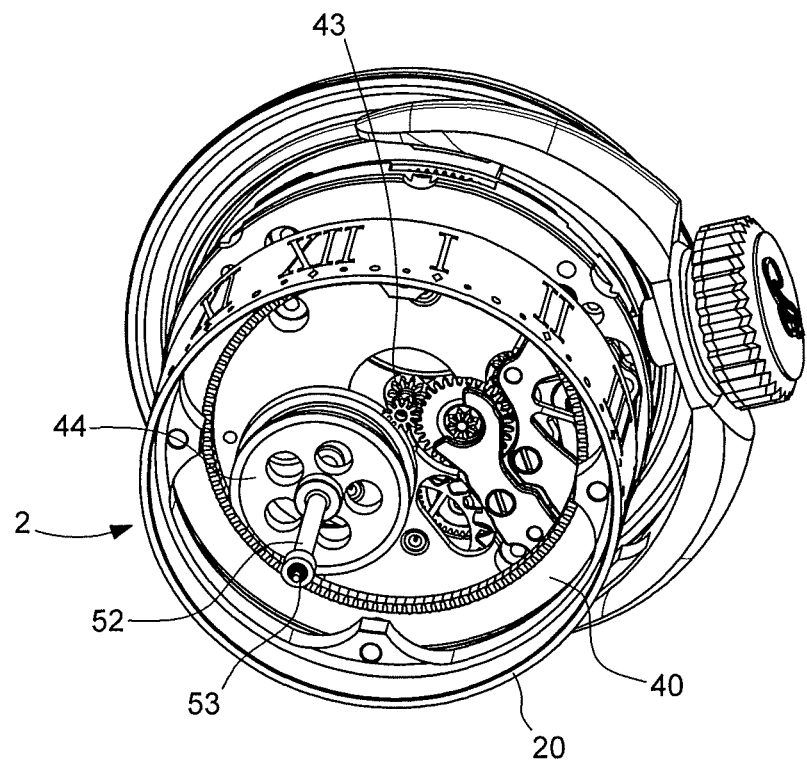
FIG. 3 illustrates a perspective view of a first roller and its drive means of a display mechanism according to the invention.

As can be observed in FIGS. 2b and 3, the first drive means include a first toothed ring 40, mounted on support member 41, and more specifically on movable peripheral portion 410, first toothed ring 40 being thus integral with first roller 2, coplanar with roller 2, and also pivoting about axis of rotation A.

Second drive means 5 include a second toothed ring 50, mounted on support member 51, and more specifically on movable peripheral portion 510, second toothed ring 50 being thus integral with second roller 3, coplanar with roller 3 and also pivoting about axis of rotation A.

Toothed rings 40, 50 can be removably mounted on support member 41, 51 respectively, by means of screws for example. It is also possible to envisage permanently fixing the toothed ring on support member 41, 51, by means of a weld for example.

Thus, first toothed ring. 40 is driven by an output arbor 42 movement 100 under the upper bar, the arbor 42 comprising a pinion 43 arranged to meth with a toothed wheel 44 which drives toothed ring 40 at the rate of one revolution in 12 or 24 hours in the case where first roller 3 is arranged to display the current time. This gear kinematics is shown in FIGS. 2b and 3.

Second toothed ring 50 is driven by means of an arbor 52, integral with toothed wheel 44 via one of its ends, arbor 52 passing through central portion 411 of support member 41 and intermediate bar 14 through an orifice provided for this purpose and including a second pinion 53 mounted at its free end. This second pinion 53 is thus housed inside intermediate bar 14 and is arranged to mesh with a date wheel 54 driving second toothed wheel 50.

Figure 4:
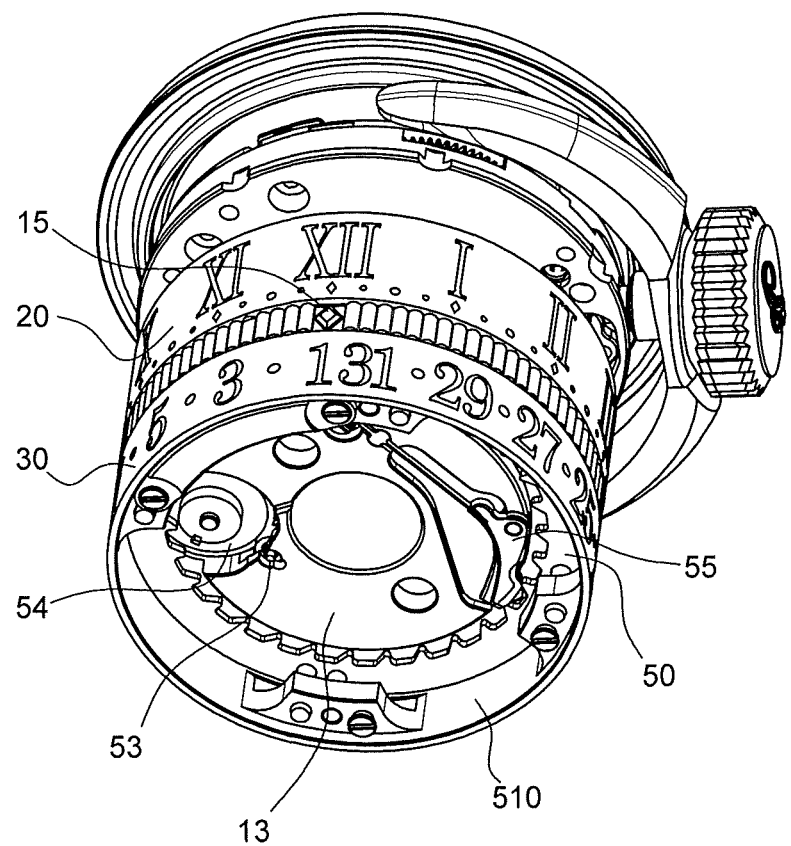
FIG. 4 illustrates a perspective view of a second roller and its drive means of a display mechanism according to the invention.

As can be observed in FIG. 4, intermediate bar 4 also receives a date jumper 55, the jumper 55 being able to be uncoupled when the date is corrected. In the configuration described, first roller 2 displays the time and second roller 3 displays the date; those skilled in the art could easily envisage other types of displays without any particular difficulty.

As illustrated, lower bar 13 is surmounted in succession by second roller 3, intermediate bar 14, first roller 2 and case 11, with frame 10 acting as central support member for these elements, and lower bar 13, intermediate bar 14, case 11 and fixed central portions 411, 511 being removably secured thereto.

Figure 1B:
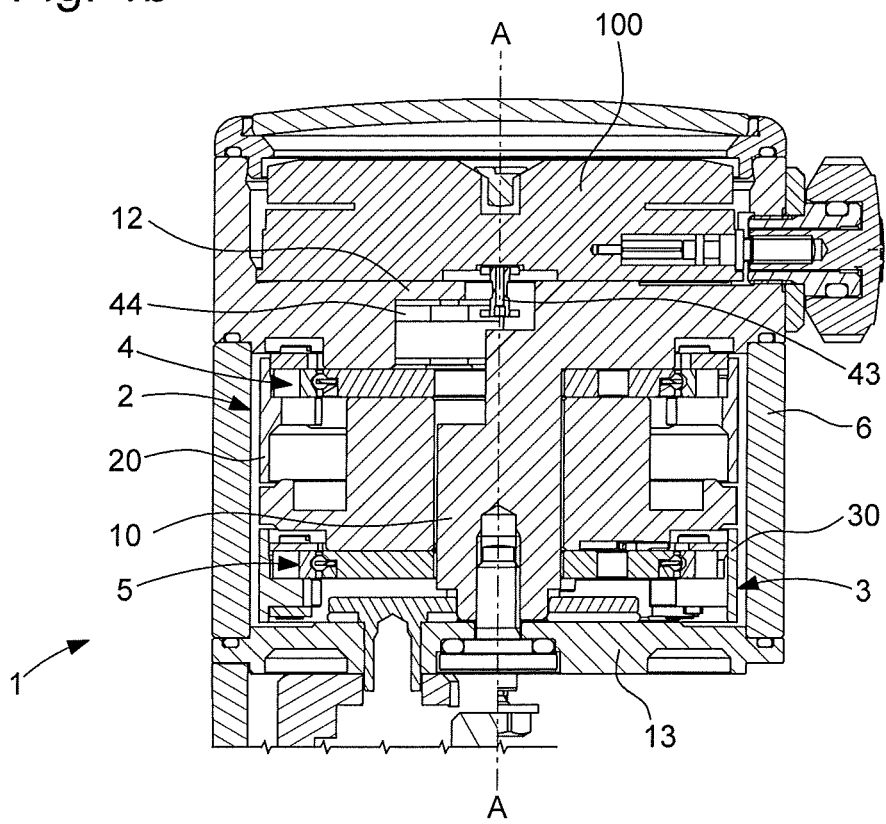

According to the preferred embodiment illustrated in FIG. 1, the device includes a crystal 6 arranged at its periphery, crystal 6 taking the form of a transparent cylinder and being housed at each of its upper and lower ends inside a groove formed in lower bar 13 and upper bar 12. Advantageously, lower bar 13 and upper bar 12 have a slightly greater diameter than first roller 2, second roller 3 and intermediate bar 14, so that crystal 6 can be positioned without any difficulty.

To secure the assembly, frame 10 is fixed to case 11 on one hand, and to fixed central portion 511 on the other, by its lower and upper ends by means of screws. Lower bar 13 is fixed to fixed central portion 511 once crystal 6 is set in place.

The different variants of the invention allow roller displays to be made for all sorts of indications inside the reduced volume of a writing instrument or of a watch of normal dimensions.

The invention claimed is:

1. A device for displaying at least one time-related magnitude, the device comprising:
 a timepiece movement including at least one time base and at least energy source which extend in a first same plane; and
 at least one roller pivotably mounted about an axis of rotation of the at least one roller and which extends in a second plane parallel to the first plane,
 wherein said at least one roller includes a display strip arranged on an outer periphery of the at least one roller and on which at least one indication of time-related magnitude is inscribed,
 wherein the timepiece movement drives in rotation said at least one roller about the axis of rotation via drive means which extend in the second plane,
 wherein said at least one roller and the timepiece movement are centered about the axis of rotation of the at least one roller,
 wherein the timepiece movement includes a pinion that drives and is meshed with a toothed gear of the drive means, the toothed gear being integral with said at least one roller, and
 wherein the pinion is disposed within the outer periphery of the at least one roller.

2. The display device according to claim 1, further comprising a frame surmounted by a case arranged to receive said timepiece movement, said case being integral with said frame.

3. The display device according to claim 2, wherein the frame comprises an upper bar at one end of the frame and a lower bar at another end of the frame.

4. The display device according to claim 3, wherein the at least one roller comprises a first roller and a second roller, each roller comprising a display strip arranged on a circumference of the respective roller and in a plane perpendicular to the axis of rotation of the respective roller.

5. The display device according to claim 4, wherein said first roller pivots about the upper bar, and said second roller pivots about the lower bar, each roller comprising drive means for pivoting the respective rollers about the rotational axis of the respective roller.

6. A writing instrument comprising a display device according to claim 1, said display device being mounted at one end of the writing instrument or inside a body of the writing instrument.

7. The display device according to claim 1, wherein the at least one roller comprises a first roller and a second roller and,
 wherein the first roller displays the time and the second roller displays the date.

8. The display device according to claim 7, wherein the display device further comprises an indicator which indicates the current time and/or date, the indicator being disposed between the first and second rollers.

9. A device for displaying at least one time-related magnitude, the device comprising:
 a timepiece movement including at least one time base and at least one energy source which extend in a first same plane; and
 at least one roller pivotably mounted about an axis of rotation of at least one roller and which extends in a second plane parallel to the first plane,
 wherein said at least one roller includes a display strip arranged on an outer periphery and on which at least one indication of the time-related magnitude is inscribed,
 wherein the timepiece movement drives in rotation said at least one roller about the axis rotation via drive means which extend in the second plane,
 wherein said at least one roller and the timepiece movement are centered about the axis of rotation of the at least one roller,
 wherein the display device further comprises a flame surmounted by a case arranged to receive said timepiece movement,
 wherein the frame comprises an upper bar at one end of the frame and a lower bar at another end of the frame,
 wherein the at least one roller comprises a first roller and a second each roller comprising a display strip arranged on a circumference of the respective roller and in a plane perpendicular to the axis of rotation of the respective roller, and
 wherein a fixed intermediate bar is arranged between the first roller and the second roller.

10. The display device according to claim 9, wherein an intermediate bar is mounted between the first roller and the second roller, and a periphery of the intermediate bar includes an indicator for reading the time and/or the date.

11. A device for displaying at least one time-related magnitude, the device comprising:
 a timepiece movement including at least one time base and at least one energy source which extend in a first same plane, and
 at least one roller pivotably mounted about an axis of rotation of the at least one roller and which extends in a second plane parallel to the first plane,
 wherein said at least one roller includes a display strip arranged on an outer periphery and on which at least one indication of the time-related magnitude is inscribed,
 wherein the timepiece movement drives in rotation sail at least one roller about the axis of rotation via drive means which extend in the same second plane as said at least one roller, and
 wherein said at east one roller and the timepiece movement are centered about the axis of rotation of the at least one roller,
 wherein the at least one roller comprises a first roller and a second roller, each roller comprising a display strap arranged on a circumference of the respective roller and in a plane perpendicular to the axis of rotation of the respective roller, and
 wherein the first roller displays the time and the second roller displays the date.

* * * * *